T. W. GATTIS.
SCALE BEAM.
APPLICATION FILED SEPT. 17, 1912.
1,213,620.
Patented Jan. 23, 1917.
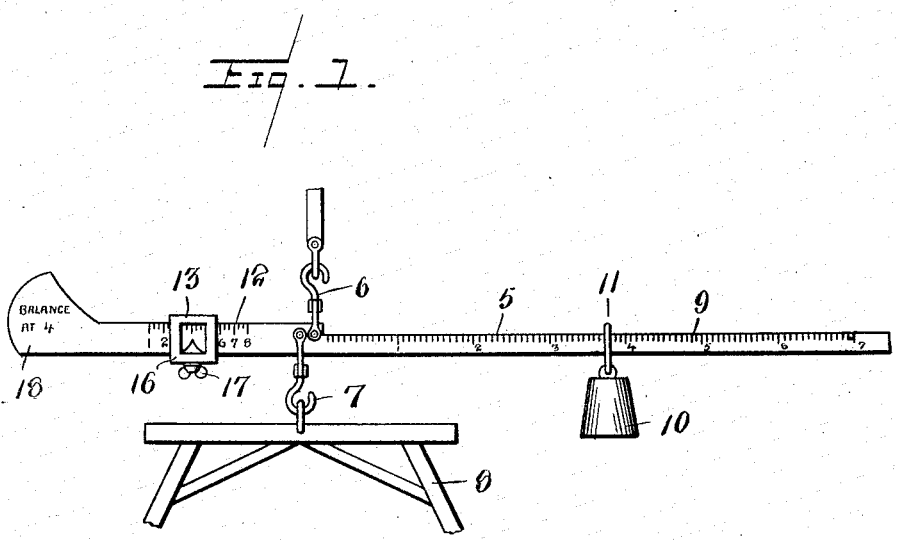
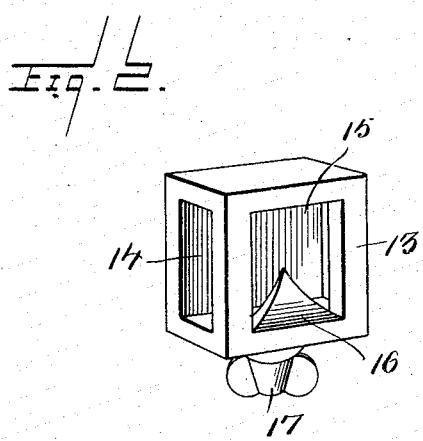
Inventor
Thomas W. Gattis
Witnesses
E. R. Ruppert
E. L. Mueller
By Victor J. Evans
Attorney

UNITED STATES PATENT OFFICE.

THOMAS WILLIAM GATTIS, OF LOHN, TEXAS, ASSIGNOR OF ONE-HALF TO SAMUEL W. HUGHES, OF BRADY, TEXAS.

SCALE-BEAM.

1,213,620.  Specification of Letters Patent.  Patented Jan. 23, 1917.

Application filed September 17, 1912. Serial No. 720,835.

*To all whom it may concern:*

Be it known that I, THOMAS W. GATTIS, a citizen of the United States, residing at Lohn, in the county of McCulloch and State of Texas, have invented new and useful Improvements in Scale-Beams, of which the following is a specification.

The general object of this invention is the provision of a scale beam particularly adapted for use in weighing bales of cotton, said beam being constructed for the purpose of ascertaining any action over the average weight of the bale; and to this end the invention consists of certain novel constructions, arrangements and combinations of devices which will be fully described hereinafter and then set forth in the appended claim. This however may be used to weigh anything where a correct weight is required.

In carrying out the object of the invention generally stated above, it will be understood, of course, that the essential features thereof are susceptible to changes in details and structural arrangements, one preferred and practical embodiment being shown in the accompanying drawing, wherein:—

Figure 1 is a side elevation of the scale beam constructed in accordance with the invention and showing a portion of the frame for supporting the scale platform therefrom. Fig. 2 is an enlarged detail perspective of a balance weight block used in connection with the invention.

Referring more particularly to the accompanying drawing in which like reference characters designate similar parts, it will be seen that the invention comprises a scale beam 5 having the usual form of supporting hook 6 pivoted thereto intermediate its ends. Adjacent the hook 6 is pivoted another depending hook 7 to which is attached the frame 8 for supporting the platform of the scale (not shown).

Upon one side of the fulcrumed point of the scale beam 5 the same is provided with the graduations 9 which are used for the purpose of ascertaining the exact weight of a bale of cotton by means of a solid scale weight 10 having a hook 11 which is adapted to engage said beam for sustaining the weight therefrom. On the other side of the fulcrumed point of the scale beam 5 the same is provided with minute graduations 12 and adjustable longitudinally upon this portion of the scale beam is a balancing weight block 13 which may be constructed of any desirable material. The block 13 is provided with a longitudinal opening 14 adapted to receive the scale beam and a transverse sight opening 15 through which the graduations 12 may be seen. A tapering indicating hand 16 having a plurality of inwardly curved faces extends from the lower horizontal edge of the sight opening 15 whereby the exact reading may be obtained upon the scale beam. Extending through the bottom of the block 13 is a set screw 17 which is adapted to engage the under surface of the scale beam 5 whereby said block may be secured in position after being moved to the desired point.

It is to be understood that the average weight of a bale of cotton is approximately five hundred pounds but often the weight varies as much as one hundred or one hundred and fifty pounds in excess of the average and it is the purpose of this invention to manufacture the scales and test the same before using so that the block 13 may be moved to a predetermined point upon the graduation 12, at which point the scale beam 5 will balance should the bale of cotton be of the average weight. For the purpose of informing the user of the scale at which point from the graduations 12 the block 13 is to be moved in order to balance the beam 5 for the average weight of the bale of cotton, the manufacturer might place certain indicia on the enlarged end 18 of the scale beam, such indicia indicating the point on said graduations where the scale beam will balance when the bale of cotton is placed upon the scale. If the said bale is excessive in weight, the correct weight thereof may be ascertained by moving the scale weight 10 backward and forward upon the graduations 9 until said scale beam is balanced, it being understood of course that the weight 10 is sustained from the zero point of the graduations 9 when the bale of cotton is first placed upon the scales.

From the foregoing description taken in connection with the accompanying drawing, it will be seen that the invention contemplates providing a device which is simple in construction, thus reducing the cost of manufacture of the same to a minimum and which is durable and effective in carrying out the purpose for which it is designed.

What is claimed is:—

In a scale for weighing bales of cotton, a steelyard having a short arm graduated for a portion of its length and between its ends, a solid scale weight adjustable in the long arm of the steelyard, a counterbalance weight on the short arm of said yard having an indicating hand and movable over said graduations, an enlargement on the steelyard at one end of the short arm having indicia thereon indicating the graduation with which said hand must register to insure the balancing of the yard when the scale weight is at the meeting ends of the arms, and means on the counterbalance weight for locking the same against movement.

In testimony whereof I affix my signature in presence of two witnesses.

THOMAS WILLIAM GATTIS.

Witnesses:
LEE SHERROD,
BEN ANDERSON.

Copies of this patent may be obtained for five cents each, by addressing the "Commissioner of Patents, Washington, D. C."